US008166810B2

(12) United States Patent
Chen et al.

(10) Patent No.: US 8,166,810 B2
(45) Date of Patent: May 1, 2012

(54) SWINGING APPARATUS AND ENERGY HARVESTER USING THE SAME

(75) Inventors: Chung-De Chen, Miaoli County (TW); Yu-Jen Wang, Taipei County (TW); Chien Li, Tainan County (TW); Shih-Hao Wang, Taichung (TW); Pin Chang, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 579 days.

(21) Appl. No.: 12/420,166

(22) Filed: Apr. 8, 2009

(65) Prior Publication Data
US 2010/0083746 A1 Apr. 8, 2010

(30) Foreign Application Priority Data

Oct. 8, 2008 (TW) .................................. 97138635 A

(51) Int. Cl.
*B60C 23/02* (2006.01)
(52) U.S. Cl. ............................ 73/146.4; 73/146; 340/442
(58) Field of Classification Search .................. None
See application file for complete search history.

(56) References Cited

U.S. PATENT DOCUMENTS

| | | | | |
|---|---|---|---|---|
| 5,409,049 A | * | 4/1995 | Renier | 152/418 |
| 5,707,215 A | * | 1/1998 | Olney et al. | 417/233 |
| 5,934,882 A | * | 8/1999 | Olney et al. | 417/233 |
| 5,941,692 A | * | 8/1999 | Olney et al. | 417/233 |
| 6,407,484 B1 | | 6/2002 | Oliver et al. | |
| 6,411,016 B1 | * | 6/2002 | Umeda et al. | 310/339 |
| 6,742,386 B1 | * | 6/2004 | Larson | 73/146.4 |
| 7,116,036 B2 | | 10/2006 | Balasubramaniam et al. | |
| 7,126,233 B2 | * | 10/2006 | Thomas et al. | 290/1 R |
| 7,157,835 B2 | * | 1/2007 | Sakai | 310/339 |
| 7,256,050 B2 | | 8/2007 | Morseman et al. | |
| 7,629,700 B2 | * | 12/2009 | Begley et al. | 290/1 R |
| 2004/0075363 A1 | | 4/2004 | Malkin et al. | |
| 2005/0151375 A1 | | 7/2005 | Cheung et al. | |
| 2007/0152511 A1 | * | 7/2007 | Sakai et al. | 310/10 |
| 2008/0084123 A1 | | 4/2008 | Szwilski et al. | |

* cited by examiner

*Primary Examiner* — Lisa Caputo
*Assistant Examiner* — Jermaine Jenkins
(74) *Attorney, Agent, or Firm* — Morris Manning & Martin LLP; Tim Tingkang Xia, Esq.

(57) ABSTRACT

A swinging apparatus comprising an energy provider and a swinging mechanism disposed thereon. By means of adjusting the size and shape of the swinging mechanism and adjusting a distance between the swinging mechanism and the energy provider so as to control the ratio of the distance between the swinging mechanism and the energy provider to a characteristic value corresponding to the swing mechanism in a range between 4 and 0.25, the swinging frequency of the swinging mechanism may be adjusted automatically to comply with the variation of the motion frequency of the energy provider. The present invention further provides an energy harvester to work with the swinging apparatus and a coil to generate an induced current for power generation during the swing of the swing mechanism. In the present invention, the natural frequency of the swing mechanism may be adjusted according to the rotational velocity of the energy provider.

32 Claims, 15 Drawing Sheets

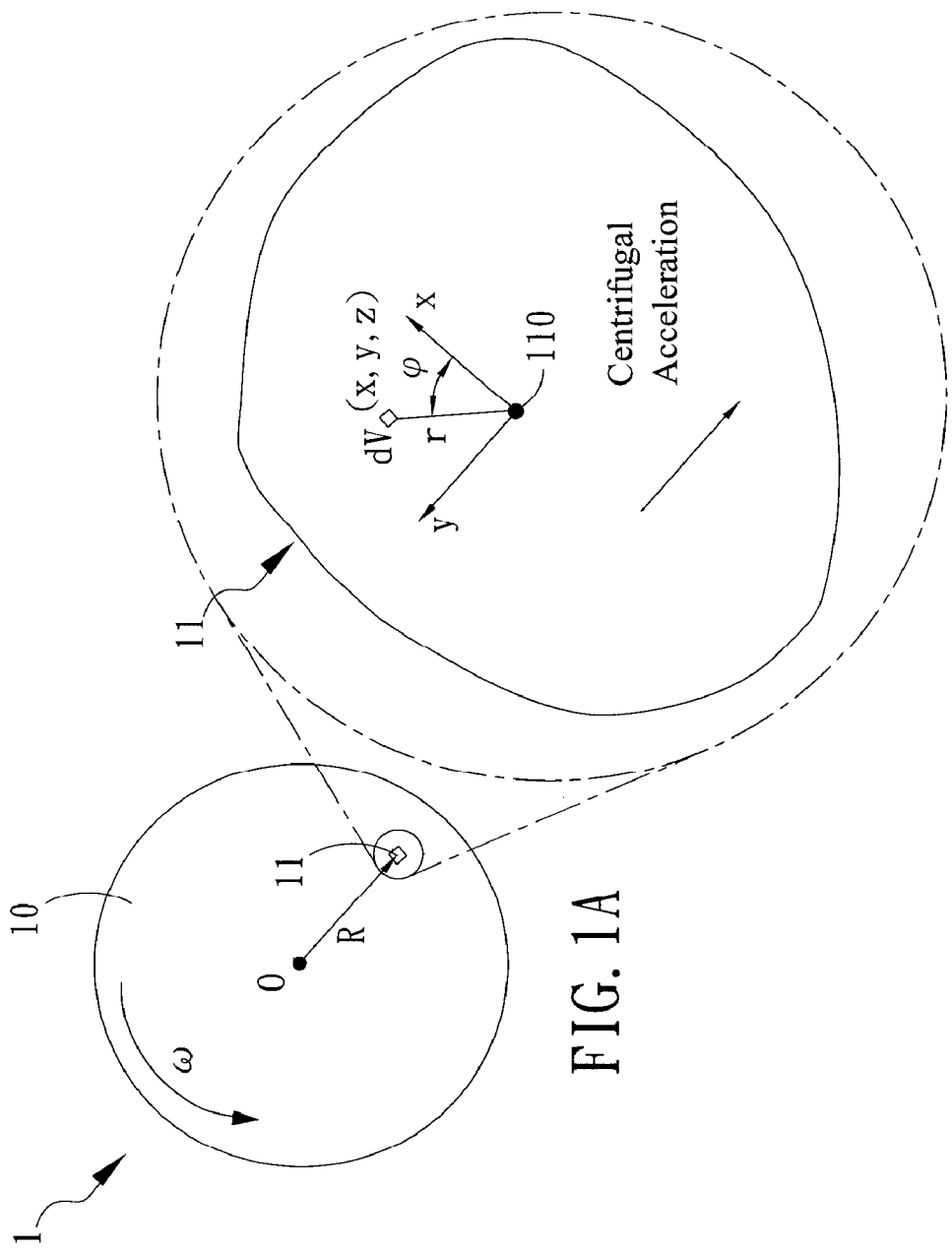

SWINGING APPARATUS AND ENERGY HARVESTER USING THE SAME

BACKGROUND OF THE INVENTION

1. Field of the Invention

The present invention generally relates to a mechanical-to-electrical energy conversion technology and, more particularly, to a swinging apparatus and an energy harvester using the swinging apparatus wherein the swinging frequency can be adjusted automatically and mechanical energy can be converted to electrical energy.

2. Description of the Prior Art

The tires play an important role when the performance and safety of a vehicle is concerned. If the tire condition can be monitored, danger due to tire puncture can be prevented, adaptability of roads can be improved, gasoline consumption can be reduced, lifetime of the tires can be lengthened, and the cost of a vehicle can be reduced. To effectively monitor the tire condition, the tire pressure monitoring system (TPMS) has been adopted by the vehicle industry. According to National Thruway and Highway Traffic Safety Administration (NTHTSA), since 2007, all the cars to be sold in the U.S. have to be equipped with tire pressure monitoring systems, which will soon be the next big thing in the car electronic applications.

The TPMS is used for real-time automatic tire pressure monitoring when the car is moving so as to issue an alarm of a flat or low-pressure tire to insure driving safety. The TPMS is an alarm system for protecting the lives of the driver and the passengers. Statistically, there will be 29,000,000 cars demanded in Europe and 18,000,000 units demanded in Europe by the year of 2010, which leads to a total of 192,000,000 TPMS's. The power consumption of a TPMS is 70 µW as powered by Li batteries. Even though Li batteries provide sufficient energy for monitoring the tire pressure, Li batteries are harmful to the environment. Environment-friendly products are more popular in U.S. and some developed countries in Europe. According to Kyoto Protocol and ROHS, people are encouraged to manufacture environment-friendly products.

Therefore, there have been a number of various energy harvesters to replace the batteries. For example, in U.S. Pat. Pub. No. 2005/0151375, an energy harvester is disclosed to convert mechanical energy to electrical energy to be used in the pressure gauge. Magnetic movement (Faraday's Law) is used in the prior art to convert the kinetic energy into electrical energy. However, power generation by magnetic movement is limited to the moving velocity of the magnetic.

Furthermore, in U.S. Pat. No. 6,407,484, a piezoelectric energy harvester is disclosed to convert rotational energy to electrical energy. The centrifugal force of the rotational element drives the metallic sheet to expand or contract the piezoelectric material to convert strain energy to electrical energy. Moreover, in U.S. Pat. Pub. No. 2004/0075363, piezoelectric cantilever beams are used to convert vibration energy to electrical energy. Piezoelectric cantilever beams with various lengths are used to harvest vibration energy at different frequencies. Moreover, U.S. Pat. No. 7,116,036 and U.S. Pat. No. 7,256,505 also disclose an energy harvester that replaces conventional batteries.

SUMMARY OF THE INVENTION

The present invention provides a swinging apparatus comprising an energy provider and a swinging mechanism disposed thereon. By means of adjusting the distance between the swinging mechanism and the energy provider and the ratio of the swinging mechanism to a characteristic value, the swinging frequency of the swinging mechanism may be adjusted automatically with the variation of the motion frequency of the energy provider.

The present invention provides a swinging apparatus, wherein a weight loading portion is disposed on a swinging mechanism capable of swinging according to the variation of the driving energy frequency the so that the swinging mechanism causes resonance during swinging and the swinging frequency varies with the variation of the rotational frequency of the driving rotational velocity to harvest the low-frequency energy.

The present invention provides an energy harvester, wherein the natural frequency automatically varies with the variation of the driving energy frequency so that that the swinging mechanism with a weight loading portion is resonating at any time. Therefore, large displacement and large velocity are caused under any driving rotational velocity to improve the mechanical-to-electrical energy conversion efficiency.

In one embodiment, the present invention provides a swinging apparatus, comprising: an energy provider, being capable of performing a rotational movement with respect to a rotational axis; and a swinging mechanism, being disposed on the energy provider and being a specific distance away from the rotational axis, wherein a ratio of the specific distance to a characteristic value is in a range between 4 and 0.25, and the characteristic value is a ratio of the rotational inertia of the swinging mechanism to an equivalent constant of the swinging mechanism.

In another embodiment, the present invention further provides an energy harvester, comprising: an energy provider, being capable of performing a rotational movement with respect to a rotational axis; a magnetic swinging mechanism, being disposed on the energy provider and being a specific distance away from the rotational axis; and an induction coil portion, being disposed corresponding to the magnetic swinging mechanism to generate an induced current when the magnetic swinging mechanism is swinging.

BRIEF DESCRIPTION OF THE DRAWINGS

The objects, spirits and advantages of various embodiments of the present invention will be readily understood by the accompanying drawings and detailed descriptions, wherein:

FIG. 1A and FIG. 1B are schematic diagrams of a swinging apparatus according to one embodiment of the present invention;

DETAILED DESCRIPTION OF THE PREFERRED EMBODIMENT

Figure 2A:
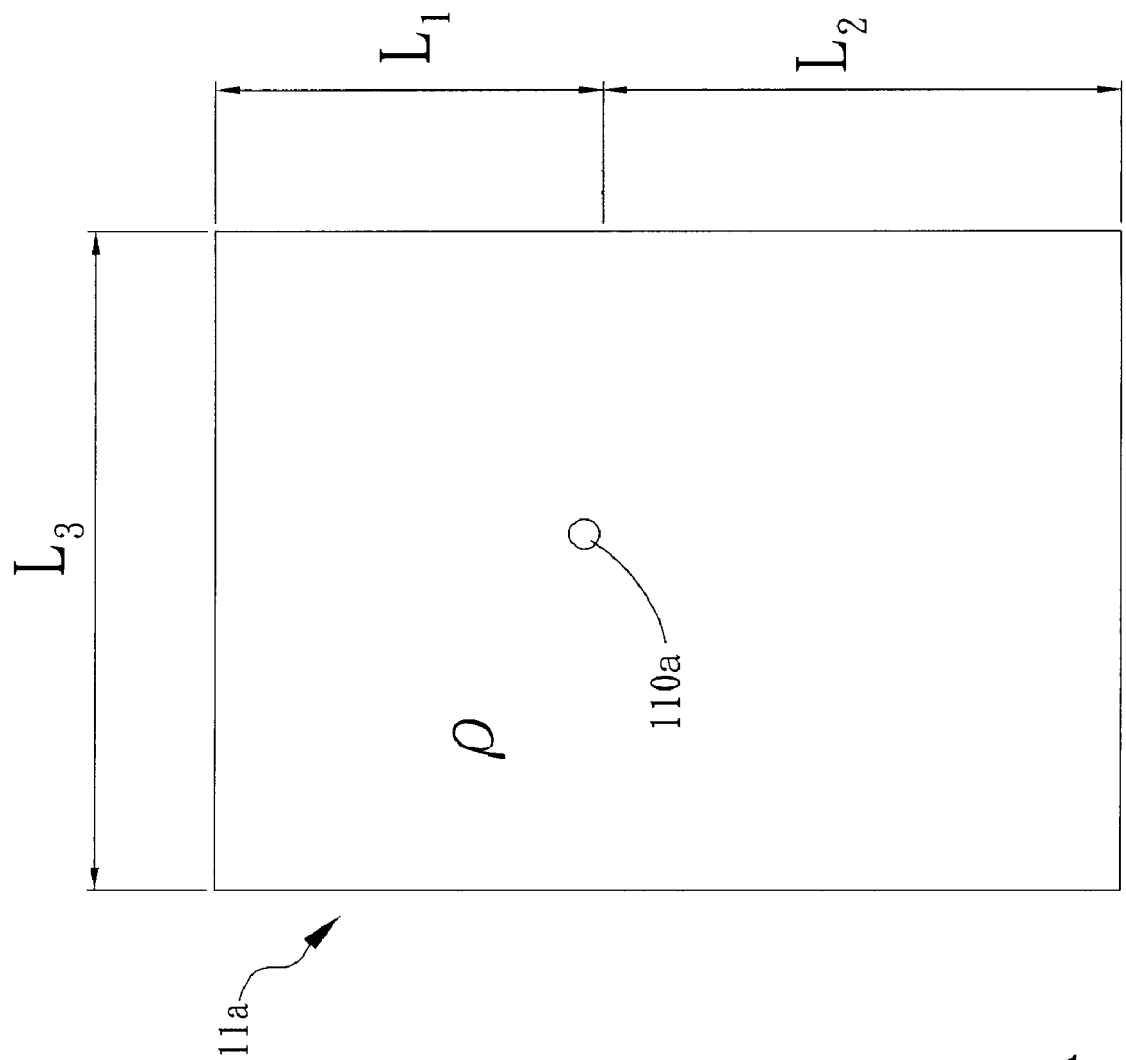
FIG. 2A to FIG. 2C are schematic diagrams of a swinging apparatus comprising a single object according to one embodiment of the present invention.

The present invention can be exemplified but not limited by the embodiments as described hereinafter.

Please refer to FIG. 1A and FIG. 1B, which are schematic diagrams of a swinging apparatus according to one embodiment of the present invention. In the present embodiment, the swinging apparatus 1 comprises a swinging mechanism 11, which is coupled to an energy provider 10. The energy provider 10 is capable of rotating with an angular velocity of ω. When the energy provider 10 is rotating, the center O is stationary (by simply rotating) or making a translational movement (by rolling). Since the center of the swinging mechanism 11 is a specific distance R from the center O of the energy provider 10, the swinging mechanism 11 experiences a centrifugal acceleration a, expressed as Equation (1):

$$a = \omega^2 R \tag{1}$$

When the energy provider 10 is rotating, the gravity the swinging mechanism 11 experiences varies with the change of its position to further drive the swinging mechanism 11 to swing with respect to its fulcrum 110 as a center. The volume of the swinging apparatus is V and the density of mass is ρ, a function of its coordinate (x,y,z). In other words, the swinging mechanism 11 comprises materials of different densities. Assuming the swinging angle is θ, the motion equation of the swinging mechanism according to the vibration theory is expressed as Equation (2):

$$I\ddot{\theta} + K\theta = -g\sin\omega t \int_V \rho r \sin\phi \, dV \tag{2}$$

wherein t is time, g is gravity acceleration. Therefore, the rotational inertia I of the swinging mechanism 11 is expressed as Equation (3):

$$I = \int_V r^2 \rho \, dV \tag{3}$$

Moreover, the swinging mechanism 11 further comprises an equivalent elastic constant K, expressed as Equation (4), a relation of the angular velocity ω, the specific distance R and an equivalent constant $$\int_V \rho r \sin\phi \, dV:$$

$$K = -\omega^2 R \int_V \rho r \sin\phi \, dV \tag{4}$$

Therefore, according to Equations (3) and (4), the swinging natural frequency $\omega_n$ can be obtained as Equation (5):

$$\omega_n = \sqrt{\frac{K}{I}} = \omega\sqrt{\frac{R}{L^*}} \tag{5}$$

wherein L* is a characteristic value, which is the ratio of the rotational inertia I to the equivalent constant, expressed as Equation (6):

$$L^* = -\frac{\int_V r^2 \rho \, dV}{\int_V \rho r \sin\phi \, dV} \tag{6}$$

According to the resonance principle in the vibration theory, if the angular velocity ω (rotational frequency) of the energy provider 10 approaches the natural frequency of the swinging mechanism 11, resonance happens to the swinging mechanism 11. In other words, as Equation (7) holds, resonance takes place:

$$L^* \cong R \tag{7}$$

Therefore, as the parameters such as the size, the density and the shape of the swinging mechanism 11 are properly selected, $\omega_n \cong \omega$. In other words, with the parameters such as the size, the density and the shape of the swinging mechanism 11 being properly selected, the swinging mechanism 11 resonates with the movement of the energy provider 10. In the present embodiment, the ratio of the specific distance R to the characteristic value L* is in a range between 4 and 0.25, In other words, the root value of the ratio in a range between 2 and 0.5, expressed as Equation (8):

$$2 \geq \sqrt{\frac{R}{L^*}} \geq 0.5 \tag{8}$$

From FIG. 1A and FIG. 1B, the swinging mechanism may be implemented in two modes. In the first mode, the swinging mechanism is a single object or a plurality of objects (with different density distributions) interconnected. In the second mode, the swinging mechanism comprises a plurality of objects and shafts. First, please refer to FIG. 2A, which is a schematic diagram of a swinging apparatus comprising a single object according to one embodiment of the present invention. In the present embodiment, the swinging mechanism 11a is disposed on an energy provider (as shown in FIG. 1A) and is a rectangular plate with a density of mass of ρ and a swinging fulcrum 110 as a fulcrum. As previously stated, the motion equation of the swinging mechanism in FIG. 2A can be obtained as Equations (9) and (10):

$$(4L_1^3 + L_1 L_3^2 + 4L_2^3 + L_2 L_3^2)\rho\ddot{\theta} + 6(L_2^2 - L_1^2)\rho a\theta = 6(L_2^2 - L_1^2)\rho g\sin\omega t \tag{9}$$

$$L^* = \frac{4L_1^3 + L_1 L_3^2 + 4L_2^3 + L_2 L_3^2}{6(L_2^2 - L_1^2)} \tag{10}$$

According to Equations (5), (7) and (8), when the energy provider is rotating, the centrifugal force enables the natural frequency $\omega_n$ of the swinging mechanism 11a to be automatically adjusted with the variation of ω. In other words, when the rotational velocity ω of the energy provider increases, the natural frequency $\omega_n$ of the swinging mechanism also increases. On the contrary, when the rotational velocity ω of the tire slows down, the natural frequency $\omega_n$ of the swinging mechanism decreases.

Figure 2B:
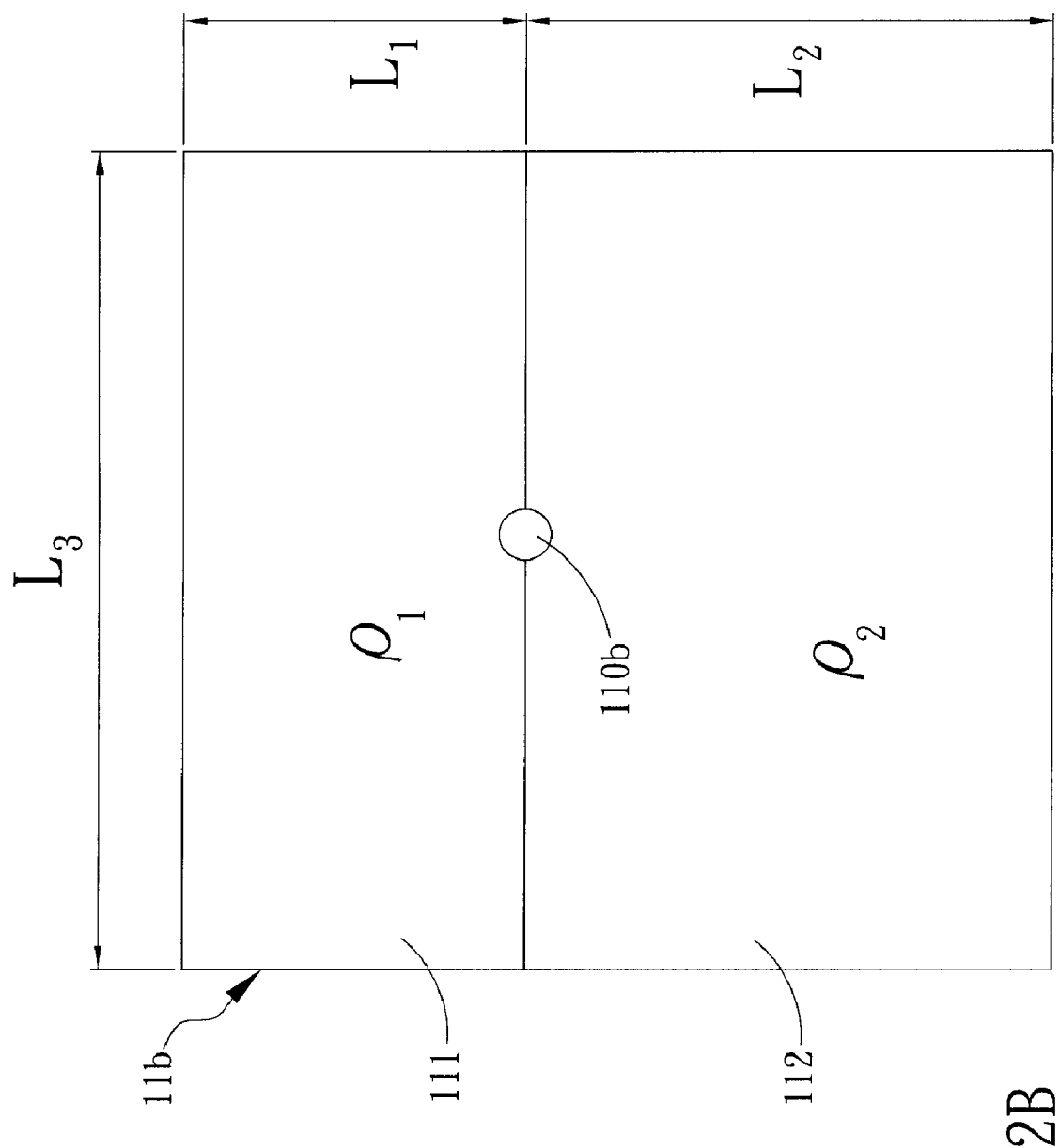

As shown in FIG. 2B, the present embodiment is basically similar to the structure in FIG. 2A. In other words, the swinging mechanism 11b comprises a single object. However, the single object on the swinging mechanism 11b is composed of two rectangular plates 111 and 112, each with a density of mass of $\rho_1$ and $\rho_2$, respectively. The swinging mechanism 11b swings with respect to a fulcrum 110b. Similarly, as previously stated, the motion equation of the swinging mechanism 11b in FIG. 2B can be obtained as Equations (11) and (12):

$$(4L_1^3\rho_1 + L_1L_3^2\rho_1 + 4L_2^3\rho_2 + L_2L_3^2\rho_2)\ddot{\theta} + 6(L_2^2\rho_2 - L_1^2\rho_1)a\theta = \quad (11)$$
$$6(L_2^2\rho_2 - L_1^2\rho_1)g\sin\omega t$$

$$L^* = \frac{4L_1^3\rho_1 + L_1L_3^2\rho_1 + 4L_2^3\rho_2 + L_2L_3^2\rho_2}{6(L_2^2\rho_2 - L_1^2\rho_1)} \quad (12)$$

According to Equations (5), (7) and (8), when the energy provider is rotating, the centrifugal force enables the natural frequency $\omega_n$ of the swinging mechanism 11b to be automatically adjusted with the variation of ω. In other words, when the rotational velocity ω of the energy provider increases, the natural frequency $\omega_n$ of the swinging mechanism also increases. On the contrary, when the rotational velocity ω of the tire slows down, the natural frequency $\omega_n$ of the swinging mechanism decreases.

Figure 2C:
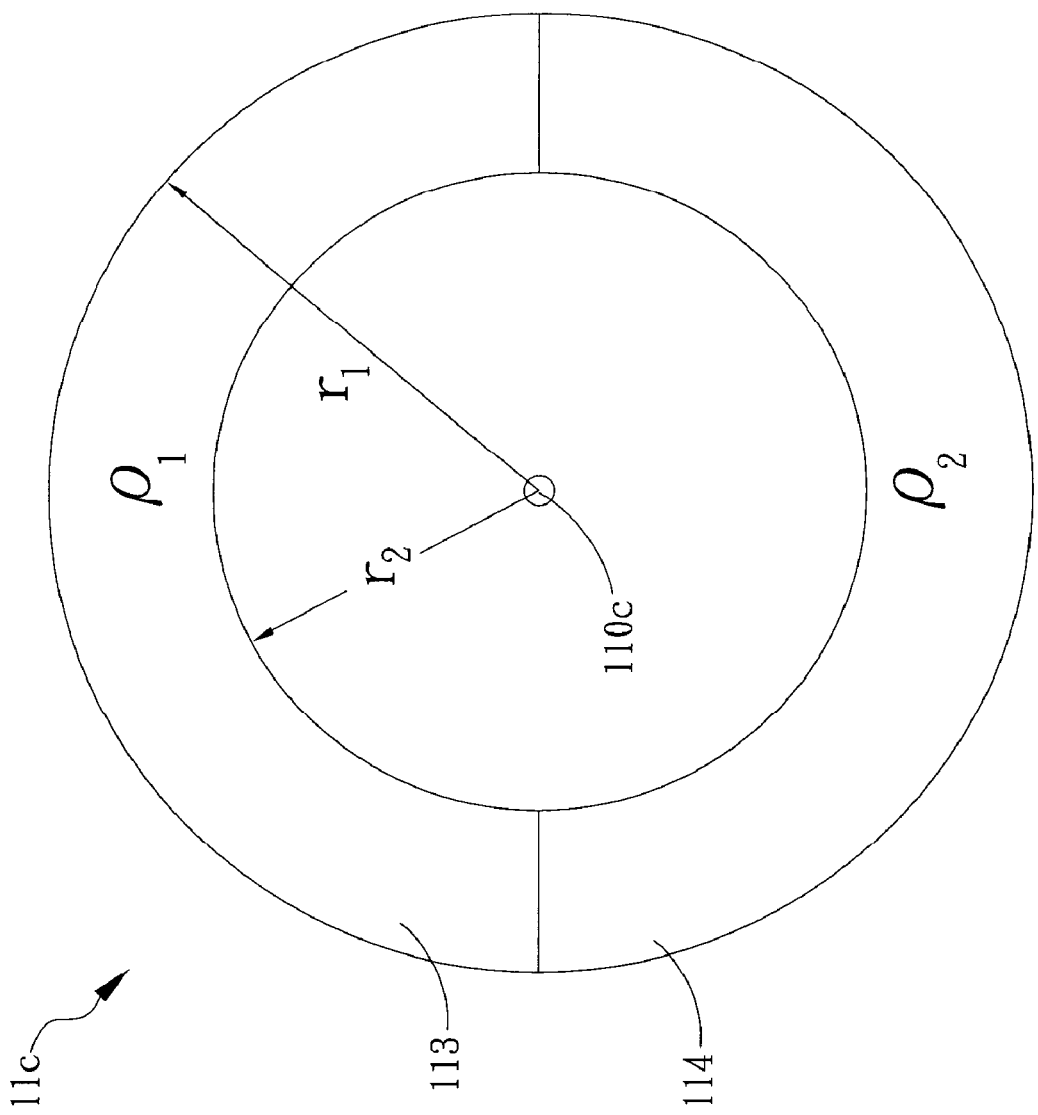

As shown in FIG. 2C, the swinging mechanism 11c is composed of two semi-rings 113 and 114, each with a density of mass of $\rho_1$ and $\rho_2$, respectively. The swinging mechanism 11c swings with respect to a fulcrum 110c. Similarly, as previously stated, the motion equation of the swinging mechanism 11c in FIG. 2C can be obtained as Equations (13) and (14):

$$[3\pi(r_1^4 - r_2^4)(\rho_1 + \rho_2)]\ddot{\theta} + [8(r_1^3 - r_2^3)(\rho_2 - \rho_1)]a\theta = \quad (13)$$
$$[8(r_1^3 - r_2^3)(\rho_2 - \rho_1)]g\sin\omega t$$

$$L^* = \frac{3\pi(r_1^4 - r_2^4)(\rho_1 + \rho_2)}{8(r_1^3 - r_2^3)(\rho_2 - \rho_1)} \quad (14)$$

Figure 3A:
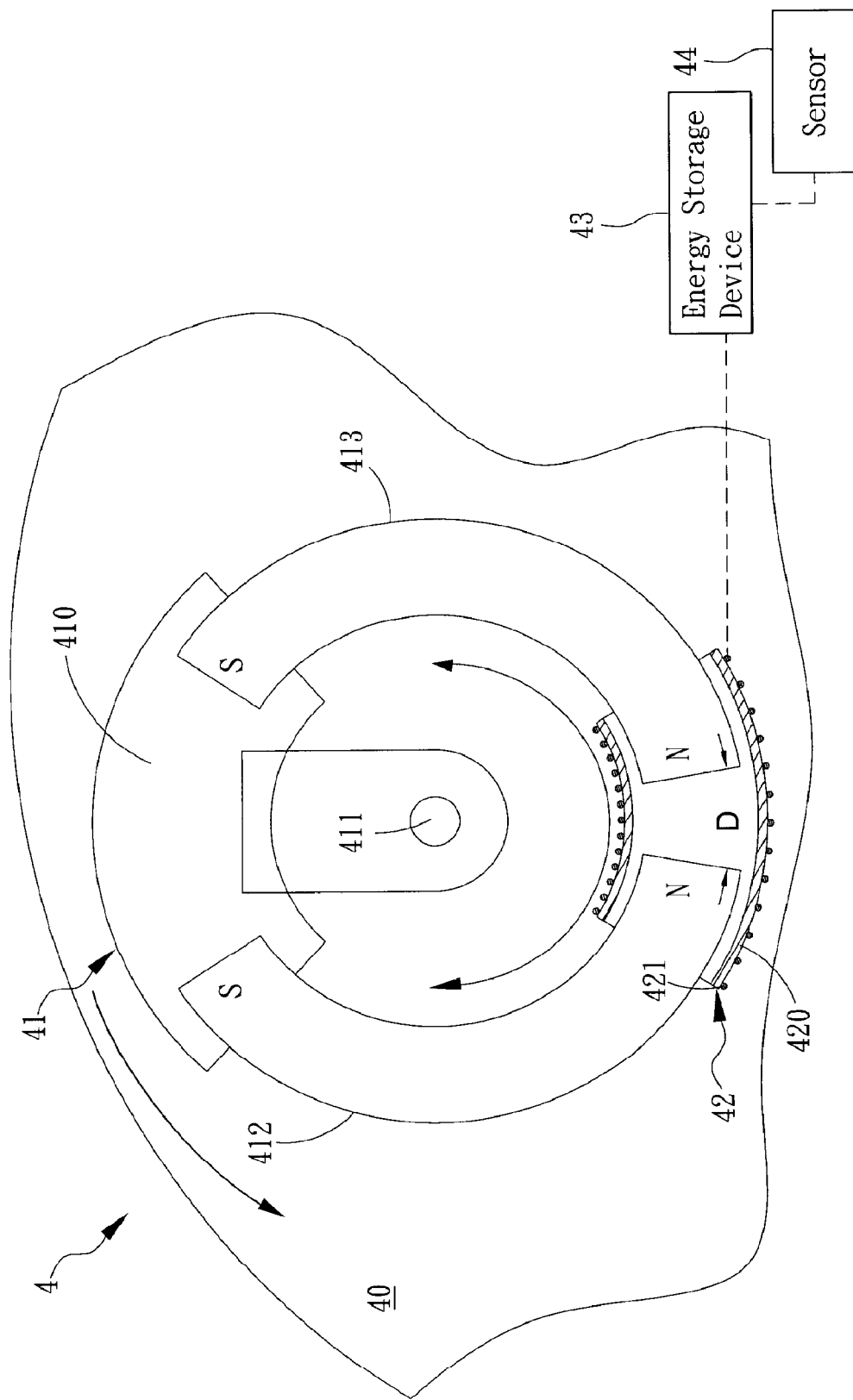
FIG. 3A and FIG. 3B are schematic diagrams of an energy harvester according to one embodiment of the present invention.
Figure 3B:
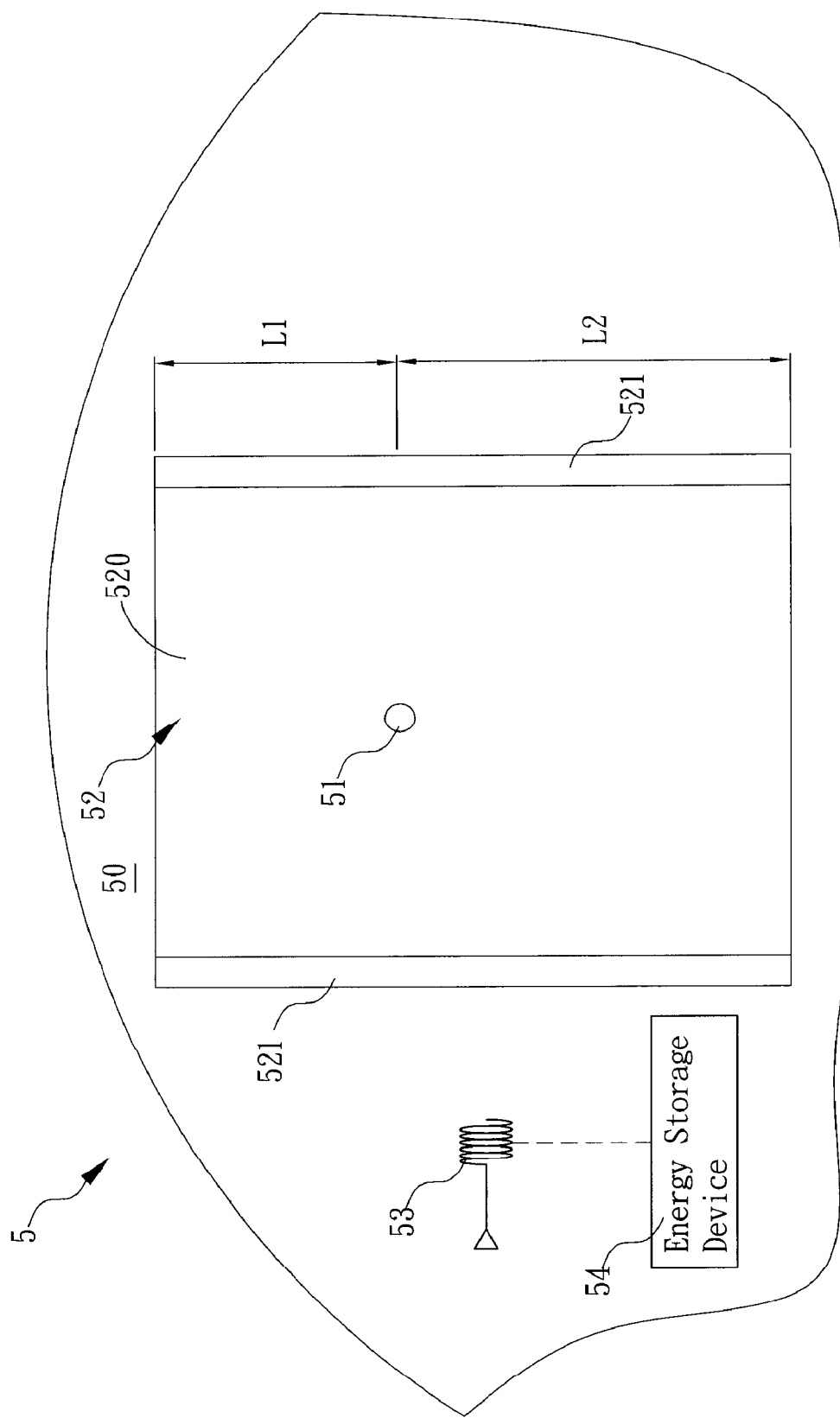

FIG. 3A and FIG. 3B are schematic diagrams of an energy harvester according to one embodiment of the present invention. In FIG. 3A and FIG. 3B, the energy harvester in the first mode is used. In other words, the magnetic effect due to the swing motion contributes to power generation. In FIG. 3A, the energy harvester 4 comprises an energy provider 40, a magnetic swinging mechanism 41, an induction coil portion 42, an energy storage device 43 and a sensor 44. The energy provider 40 is an object that is capable of rotating or rolling (exemplified by, but not limited to, a tire) with a rotational angular velocity. The magnetic swinging mechanism 41 basically is similar to the swinging mechanism 11c in FIG. 2C. The magnetic swinging mechanism 41 comprises a connecting portion 410 and at least a magnetic object. In the present embodiment, a pair of magnetic objects 412 and 413 are provided. The connecting portion 410 comprises a fulcrum 411 on one end so that the magnetic swinging mechanism 41 may swing with respect to the fulcrum 411. The operating mechanism of the magnetic swinging mechanism 41 is as stated above and is not repeated herein. The magnetic objects 412 and 413 comprise magnetic materials to exhibit a magnetic field. In the present embodiment, the magnetic objects 412 and 413 further comprises a gap D therebetween. The induction coil portion 42 comprises a pipe 420 with a curvature. On the outer wall of the pipe 420, there is an induction coil 421. On both ends of the pipe 420, parts of the magnetic objects 412 and 413 are enclosed therein. The energy storage device 43 is coupled to the induction coil 421. In the present embodiment, the energy storage device 43 is implemented by a battery or other energy storage devices. Moreover, the energy storage device 43 is further coupled to a sensor 44, which can be implemented by a pressure sensor, a temperature sensor or other sensors. When the energy provider 40 is rotating or rolling, the magnetic swinging mechanism 41 resonates to swing in the pipe. During the swinging of the magnetic swinging mechanism 41, an induced current is induced in the induction coil 421 on the outer wall of the pipe 420 to further store the induced electrical energy in the energy storage device 43 to be supplied to the sensor 44. In the present embodiment, the connecting portion 410 is analogous to the object 113 in FIG. 2C, and the pair of magnetic objects 412 and 413 are analogous to the object 114.

As shown in FIG. 3B, in the present embodiment, the energy harvester 5 as formed in FIG. 2A is used. In the present embodiment, the energy harvester comprises an energy provider 50, a magnetic swinging mechanism 52, an induction coil 53 and an energy storage device 54. The energy provider 50 is as previously stated and is not repeated herein. The magnetic swinging mechanism 52 swings with respect to a fulcrum 51. The magnetic swinging mechanism 52 comprises an object 520, which is coupled to magnetic objects 521 on both sides. Certainly, the object 520 and the magnetic objects 521 can be formed as a single object with magnetism. The induction coil 53 and the energy storage device 54 are as previously stated and are not repeated herein. Certainly, the energy storage device 54 can be coupled to the sensor, which is as previously stated and is not repeated herein.

The second mode will be described hereinafter. Please refer to FIG. 4, which is a schematic diagram of a swinging apparatus according to another embodiment of the present invention. In the present embodiment, the swinging apparatus 2 comprises an energy provider 20 and a swinging mechanism 21 comprising a swinging portion 210 and a weight loading portion 211. The energy provider 20 is capable of providing the swinging mechanism 21 with energy. The energy provider 20 is a rotator or a roller, but it is not limited thereto. In other words, the energy provider 20 is capable of changing the gravity the swinging mechanism experiences by a rotational movement. The roller is capable of rotating and translationally moving. In the present embodiment, the energy provider 20 is the rim of a tire. The rim is rotating or rolling to change the gravity experienced by the swinging portion so that the swinging portion 210 in the swinging mechanism 21 swings. The swinging portion 210 disposed on the energy provider 20 swings with respect to a fulcrum 2100. The fulcrum 2100 is coupled to the energy provider 20 via a shaft 90.

The swinging portion 210 comprises a shaft 2101 and an object 2102. The shaft 2101 is coupled to the fulcrum 2100 on one end, and the object 2102 is coupled to the other end of the shaft 2101. The object 2102 exhibits magnetism or is an object formed of metallic and magnetic materials. The weight loading portion 211 is coupled to the swinging portion 210 to enables the swinging frequency of the swinging portion 210 to vary with the variation of the frequency of the energy supplied by the energy provider 20. In the present embodiment, the weight loading portion 211 comprises a shaft 2110 and a pair of objects 2111. The center of the shaft 2110 is coupled to the fulcrum 2100, and the pair of objects 2111 are coupled to both ends of the shaft 2110, respectively. In the present embodiment, the pair of objects 2111 exhibits magnetism or are objects formed of metallic and magnetic materials.

Figure 4:
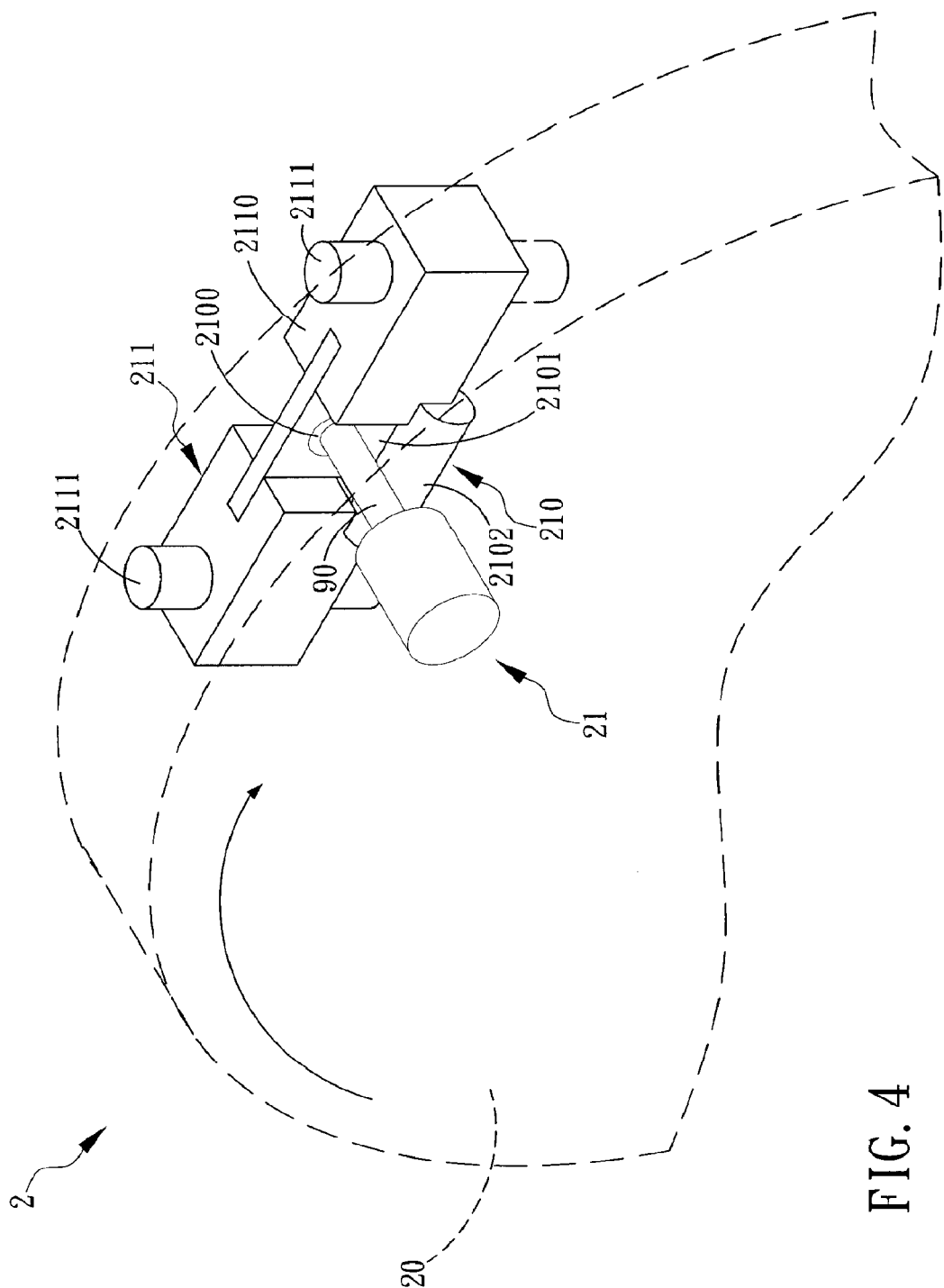
FIG. 4 is a schematic diagram of a swinging apparatus according to another embodiment of the present invention.
Figure 5B:
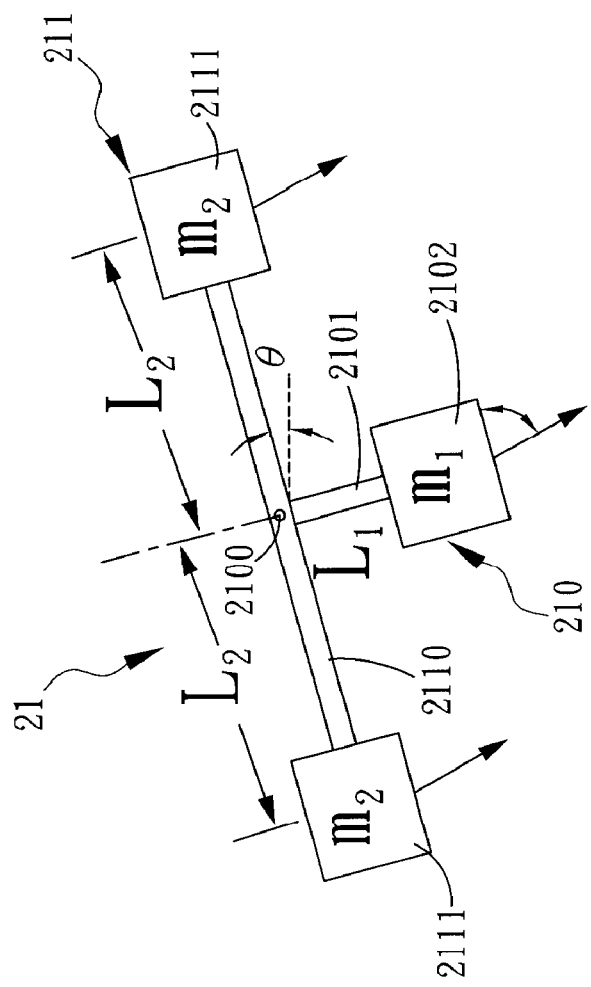
FIG. 5A and FIG. 5B are schematic diagrams showing the operations of a swinging apparatus according to another embodiment of the present invention.
Figure 5A:
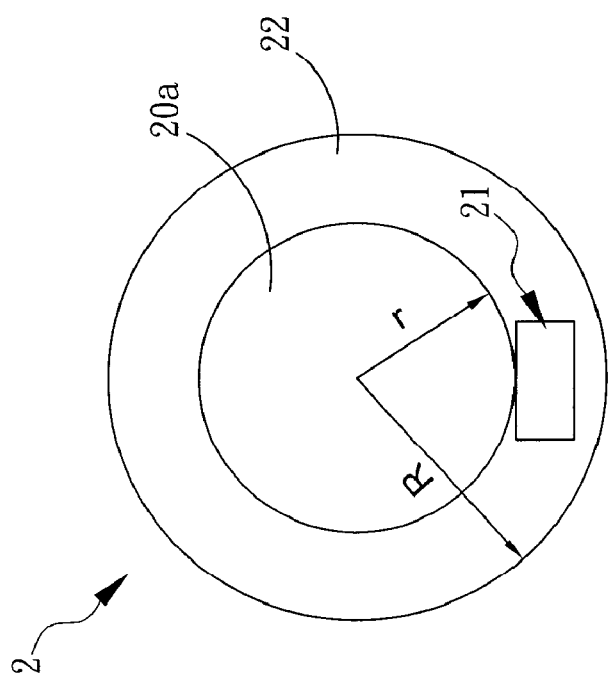

Please refer to FIG. 5A and FIG. 5B for schematic diagrams showing the operations of a swinging apparatus according to another embodiment of the present invention. In FIG. 5A, a swinging apparatus 2 in shown comprising a swinging mechanism 21 disposed on the energy provider 20a. In the present embodiment, the energy provider 20a is a rim. Label 22 denotes the tire attached onto the rim 20a. For clarity, the swinging portion and the weight loading portion in FIG. 5B are reduced from the swinging portion and the weight loading portion in FIG. 4, wherein identical labels denote identical elements. According to the vibration theory, the motion equation of the system in FIG. 5B is expressed as Equation (15):

$$[m_1 L_1^2 + 2m_2 L_2^2]\ddot{\theta} + m_1 aL_1 \theta = m_1 L_1 g \sin \omega t \quad (15)$$

wherein $m_1$ and $m_2$ represent the objects 2102 and 2111 in FIG. 4, respectively, $L_1$ represents the length of the shaft 2101, $L_2$ represents the length of the shaft 2110, and $\theta$ represents the swinging angle of the swinging mechanism 21. During the rotation of the rim 20a, the centripetal force generated by the swinging mechanism 21 is expressed as Equation (16):

$$a = \frac{rV^2}{R^2} \quad (16)$$

wherein a is the centripetal acceleration, r is the radius of the rim, R is the total radius of the rim 20a and the tire 22, and V is the velocity of the center of mass of the tire when the wheel (including the rim 20a and the tire 22) is rolling. Therefore, according to Equation (15) and Equation (16), the natural frequency $\omega_n$ of the swinging mechanism 21 is expressed as Equation (17):

$$\omega_n = \sqrt{\frac{m_1 aL_1}{m_1 L_1^2 + 2m_2 L_2^2}} = \frac{V}{R}\sqrt{\frac{rL_1}{L_1^2 + 2\frac{m_2}{m_1}L_2^2}} = \omega \sqrt{\frac{r}{L^*}} \quad (17)$$

L* is expressed as Equation (18):

$$L^* = \frac{L_1^2 + 2\frac{m_2}{m_1}L_2^2}{R_1} \quad (18)$$

In Equation (17), $\omega_n$ represents the natural frequency of the swinging mechanism 21, and $\omega$ represents the angular velocity or the rotational frequency when the energy provider 20 is rolling or rotating. From Equations (17) and (18), the relation between $m_1$, $m_2$, $L_1$ and $L_2$ is obtained. Since the present invention comprises a weight loading portion 211, when the tire is rotating, the centrifugal force enables the natural frequency $\omega_n$ of the swinging mechanism 21 varies with the variation of $\omega$ to be automatically adjusted. In other words, the natural frequency $\omega_n$ of the swinging mechanism also increases when the rotational velocity $\omega$ of the tire increases.

Figure 6:
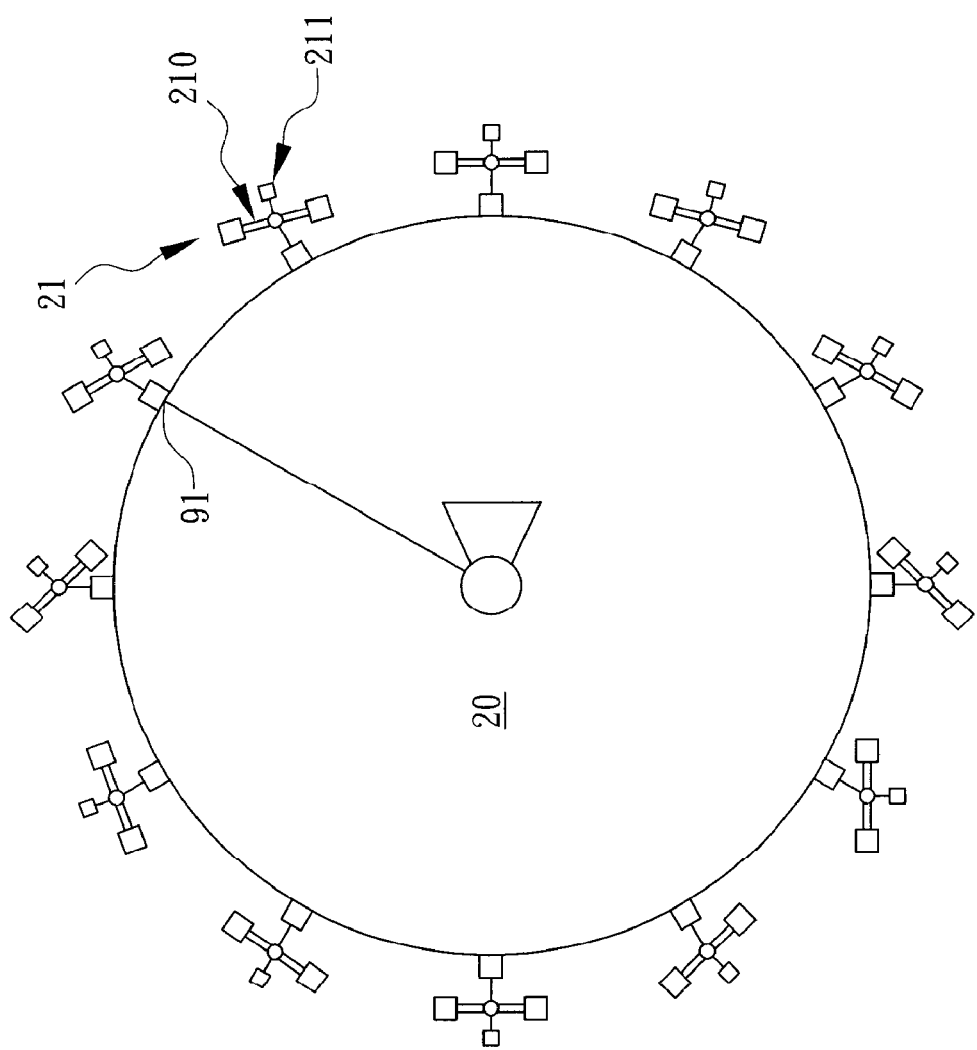
FIG. 6 is a schematic diagram showing the swing of a swinging mechanism when an energy provider is rotating in the present invention.

On the contrary, when the rotational velocity $\omega$ of the tire slows down, the natural frequency $\omega_n$ of the swinging mechanism also decreases. Please refer to FIG. 6, which is a schematic diagram showing the swing of a swinging mechanism when an energy provider is rotating in the present invention. More particularly, FIG. 6 shows the swinging of a swinging mechanism 21 comprising a swinging portion 210 and a weight loading portion 211 disposed on the position 91 on the energy provider 20 when the energy provider 20 rotates counterclockwise. Other positions excluding the position 91 on the swinging mechanism correspond to different swinging states when the energy provider 20 is rotating or rolling.

Moreover, according to Equation (17) and Equation (18), as $m_1$, $m_2$, $L_1$ and $L_2$ are properly selected, $\omega_n \cong \omega$. In other words, with the $m_1$, $m_2$, $L_1$ and $L_2$ being properly selected, the swinging mechanism 21 is resonating with the rotational frequency when the swinging mechanism 21 is rotating with the wheel. Therefore, the maximum amplitude of the rotational frequency of the swinging mechanism 21 is achieved due to resonance so as to harvest the work accomplished on the swinging mechanism experiencing the gravity when the wheel is rolling. For example, considering the radius of the wheel (including the rim 20a and the tire 22) is 0.3 m and the radius of the rim 22a is 0.2 m, if $L_1=4$ mm, $L_2=14$ mm, $m_1=2.5$ g and $m_2=5$ g, the natural frequency of the swinging mechanism 21 is equal to the rotational frequency of the wheel whatever the car speed is. In other words, the swinging mechanism is resonating at any time so as to achieve the maximum swinging amplitude.

Figure 7A:
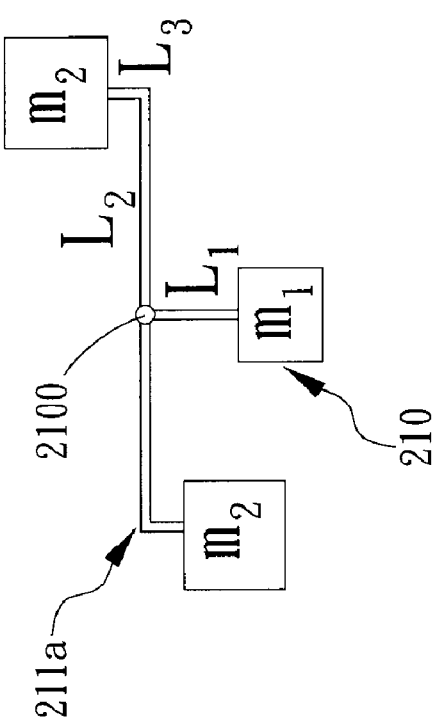
FIG. 7A to FIG. 7F are schematic diagrams of a swinging mechanism according to other embodiments of the present invention.

Please refer to FIG. 7A to FIG. 7F for the schematic diagrams of a swinging mechanism according to other embodiments of the present invention. In the embodiments in FIG. 7A to FIG. 7D, the swinging portion 210 is similar to the swinging portion in FIG. 4 except that the weight loading portion 210 in FIG. 7A to FIG. 7D is modified based on the spirits as previously stated. In FIG. 7A, the weight loading portion 211a comprises a plurality of shafts, namely the shaft $L_2$ and the shaft $L_3$. Taking the shaft on the right side of the fulcrum 2100 for example, the shaft $L_2$ is coupled to the fulcrum 2100 on one end and is coupled to the shaft $L_3$ on the other end. The other end of the shaft $L_3$ is coupled to the object $m_2$. In FIG. 7A, the motion equation of the swinging mechanism is expressed as Equations (19) and (20), wherein a is the centrifugal force, and $\theta$ is the swinging angle;

$$[m_1 L_1^2 + 2m_2(L_2^2 + L_3^2)]\ddot{\theta} + m_1 aL_1 \theta = m_1 L_1 g \sin \omega t \quad (19)$$

$$L^* = \frac{m_1 L_1^2 + 2m_2(L_2^2 + L_3^2)}{m_1 L_1} \quad (20)$$

Figure 7B:
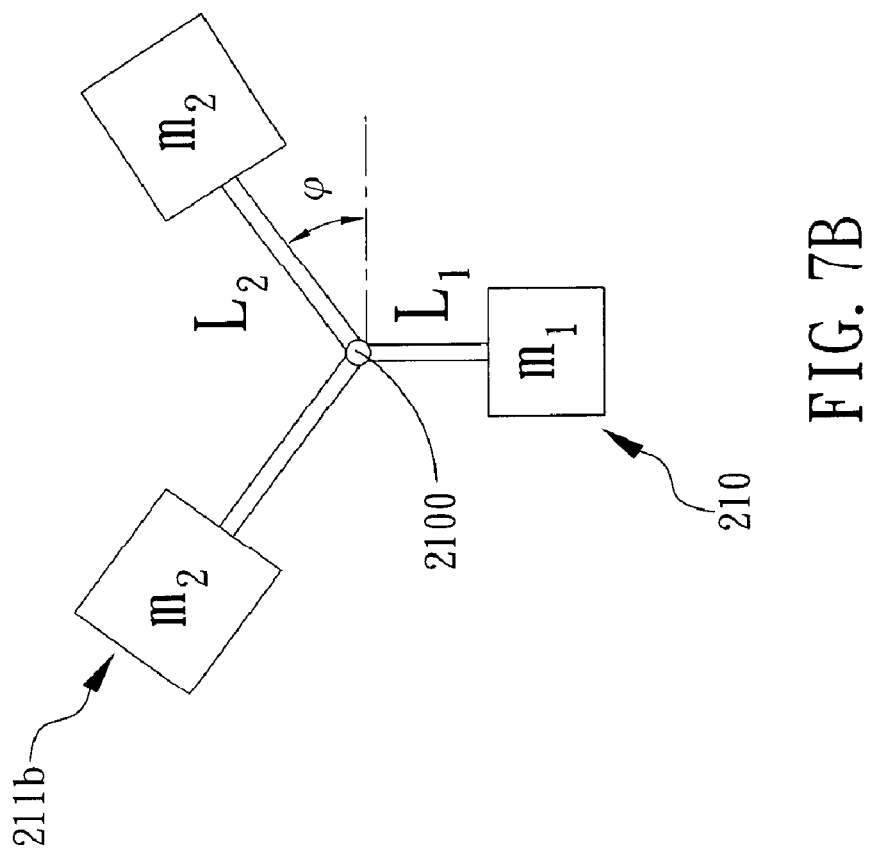

As shown in FIG. 7B, the weight loading portion 211b in the present embodiment comprises a pair of shafts coupled to the fulcrum 2100 on one end, and an angle $\phi$ is between the two shafts and the horizontal line. The motion equation is expressed as Equations (21) and (22):

$$(m_1 L_1^2 + 2m_2 L_2^2)\ddot{\theta} + (m_1 L_1 - 2m_2 L_2 \sin\phi)a\theta = \quad (21)$$
$$(m_1 L_1 - 2m_2 L_2 \sin\phi)g \sin \omega t$$

$$L^* = \frac{m_1 L_1^2 + 2m_2 L_2^2}{m_1 L_1 - 2m_2 L_2 \sin\phi} \quad (22)$$

Figure 7D:
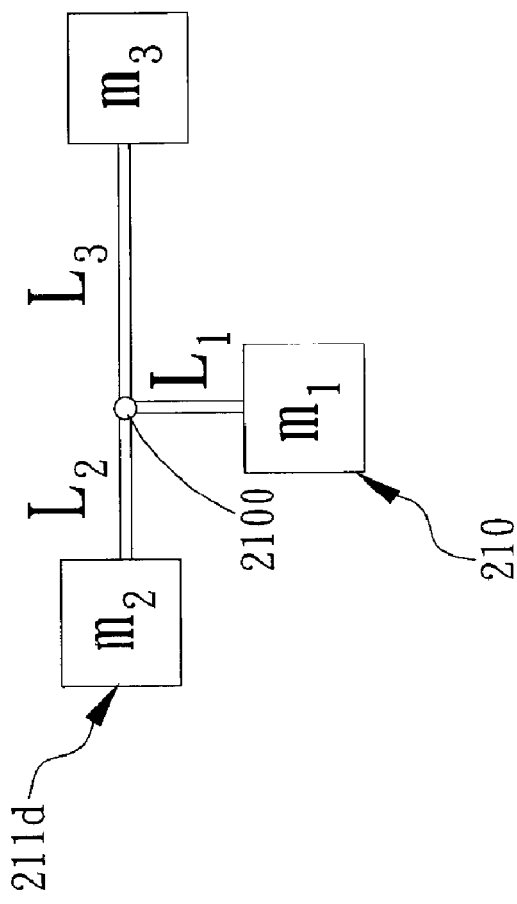
Figure 7C:
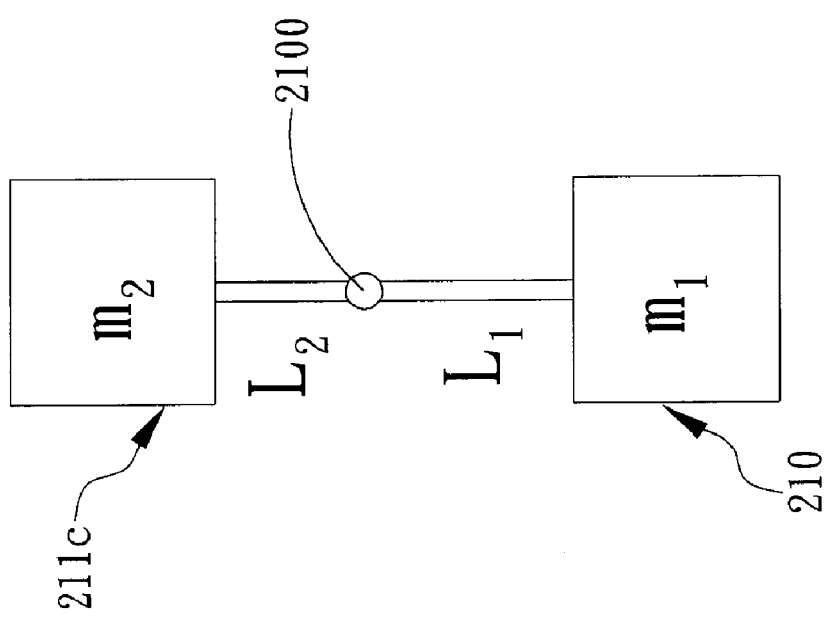

Furthermore, as shown in FIG. 7C, in the present embodiment, the weight loading portion 211c comprises a shaft $L_2$ coupled to the fulcrum 2100. The motion equation is expressed as Equations (23) and (24):

$$(m_1 L_1^2 + m_2 L_2^2)\ddot{\theta} + (m_1 L_1 - m_2 L_2)a\theta = (m_1 L_1 - m_2 L_2)g\sin\omega t \quad (23)$$

$$L^* = \frac{m_1 L_1^2 + m_2 L_2^2}{m_1 L_1 - m_2 L_2} \quad (24)$$

As shown in FIG. 7D, in the present embodiment, the weight loading portion 211d is similar to the weight loading portion 211c in FIG. 4 except that the fulcrum 2100 coupled to the shafts is not located at the center. Therefore, the distances from the objects $m_2$ and $m_3$ to the fulcrum are $L_2$ and $L_3$, respectively. In the swinging mechanism of the present embodiment, the motion equation is expressed as Equations (25), (26) and Equation (27):

$$m_2 L_2 = m_3 L_3 \quad (25)$$

$$(m_1 L_1^2 + m_2 L_2^2 + m_3 L_3^2)\ddot{\theta} + m_1 L_1 a\theta = m_1 L_1 g\sin\omega t \quad (26)$$

$$L^* = \frac{m_1 L_1^2 + m_2 L_2^2 + m_3 L_3^2}{m_1 L} \quad (27)$$

Figure 7F:
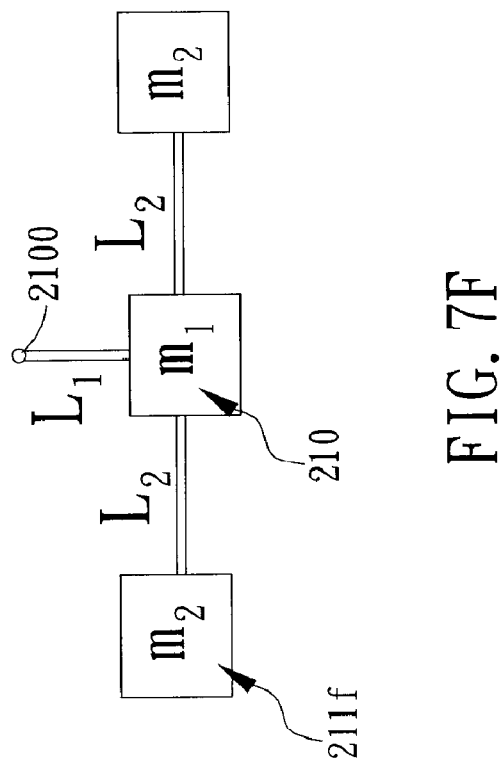
Figure 7E:
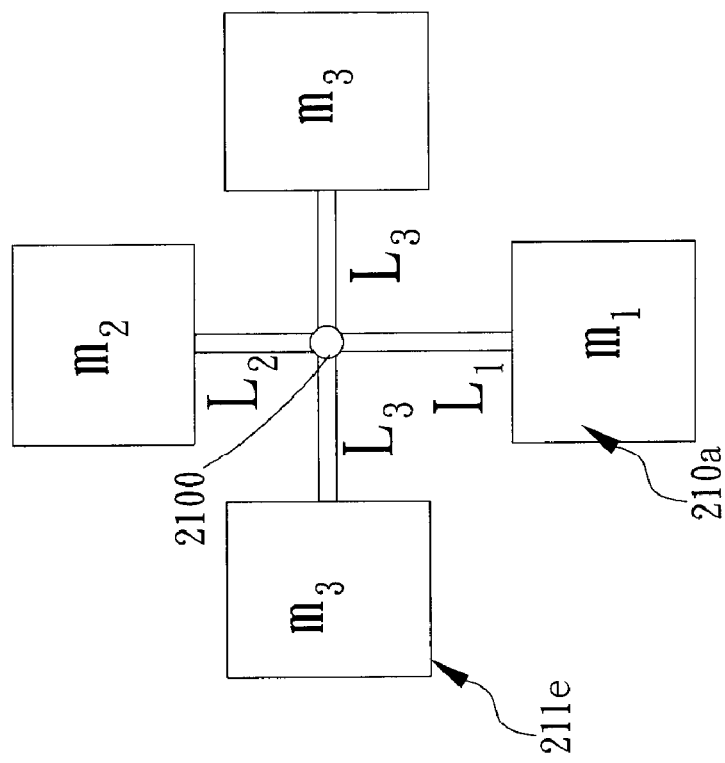

As shown in FIG. 7E, in the present embodiment, the swinging portion 210a and the weight loading portion 211e are structured as a cross shape. The swinging portion 210a comprises a shaft $L_1$. The shaft $L_1$ is coupled to an object m1 on one end, and is coupled to a fulcrum 2100 on the other end. The weight loading portion 211e comprises a shaft $L_2$ and two shafts $L_3$. These three shafts $L_2$ and $L_3$ are connected to the fulcrum 2100 on one end, and connected to objects $m_2$ and $m_3$, respectively, on the other end. The motion equation in FIG. 7E is expressed as Equations (28) and (29):

$$(m_1 L_1^2 + m_2 L_2^2 + 2m_3 L_3^2)\ddot{\theta} + (m_1 L_1 - m_2 L_2)a\theta = (m_1 L_1 - m_2 L_2)g\sin\omega t \quad (28)$$

$$L^* = \frac{m_1 L_1^2 + m_2 L_2^2 + 2m_3 L_3^2}{m_1 L_1 - m_2 L_2} \quad (29)$$

In FIG. 7F, unlike the previous embodiment, the weight loading portion 211f is not coupled to the fulcrum 2100. The shafts $L_2$ of the weight loading portion 211f are both coupled to the object $m_1$ of the swinging portion 210. The motion equation of the swinging mechanism in FIG. 7F is expressed as Equations (30) and (31):

$$[m_1 L_1^2 + 2m_2(L_1^2 + L_2^2)]\ddot{\theta} + (m_1 + 2m_2)L_1 a\theta = (m_1 + 2m_2)L_1 g\sin\omega t \quad (30)$$

$$L^* = \frac{m_1 L_1^2 + 2m_2(L_1^2 + L_2^2)}{(m_1 + 2m_2)L_1} \quad (31)$$

From the motion equations in the previous embodiments, the relation between the natural frequency of $\omega_n$ of the swinging mechanism and the motion frequency of $\omega$ of the energy provider can be acquired. Therefore, the design of the swinging mechanisms in FIG. 7A to FIG. 7F enables the natural frequency $\omega_n$ to vary with the frequency $\omega$ of the power from the energy provider. As the mass of the object and the shaft length are properly selected, $\omega_n \cong \omega$.

Figure 8A:
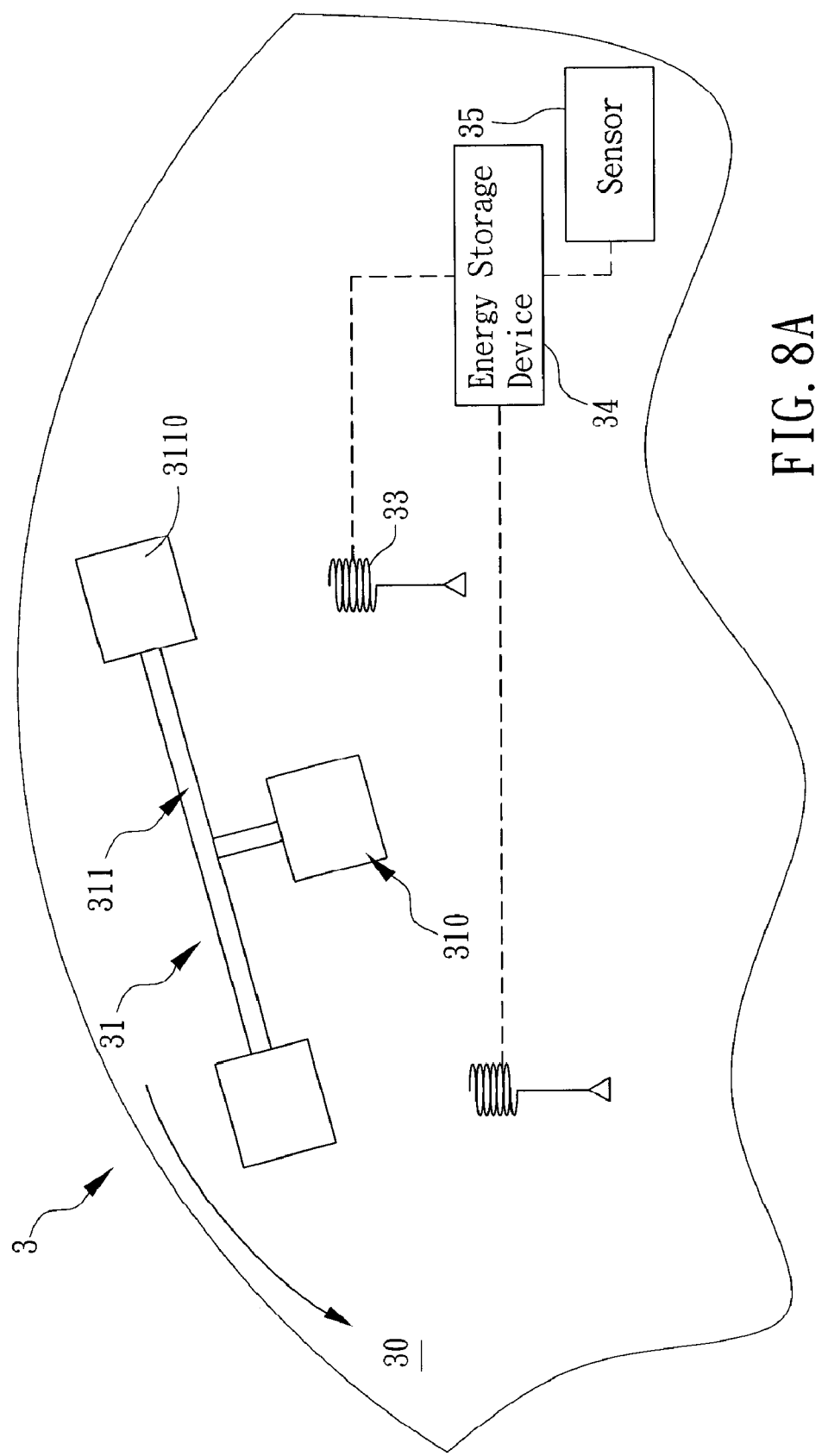
FIG. 8A is a schematic diagram of an energy harvester according to another embodiment of the present invention.
Figure 9:
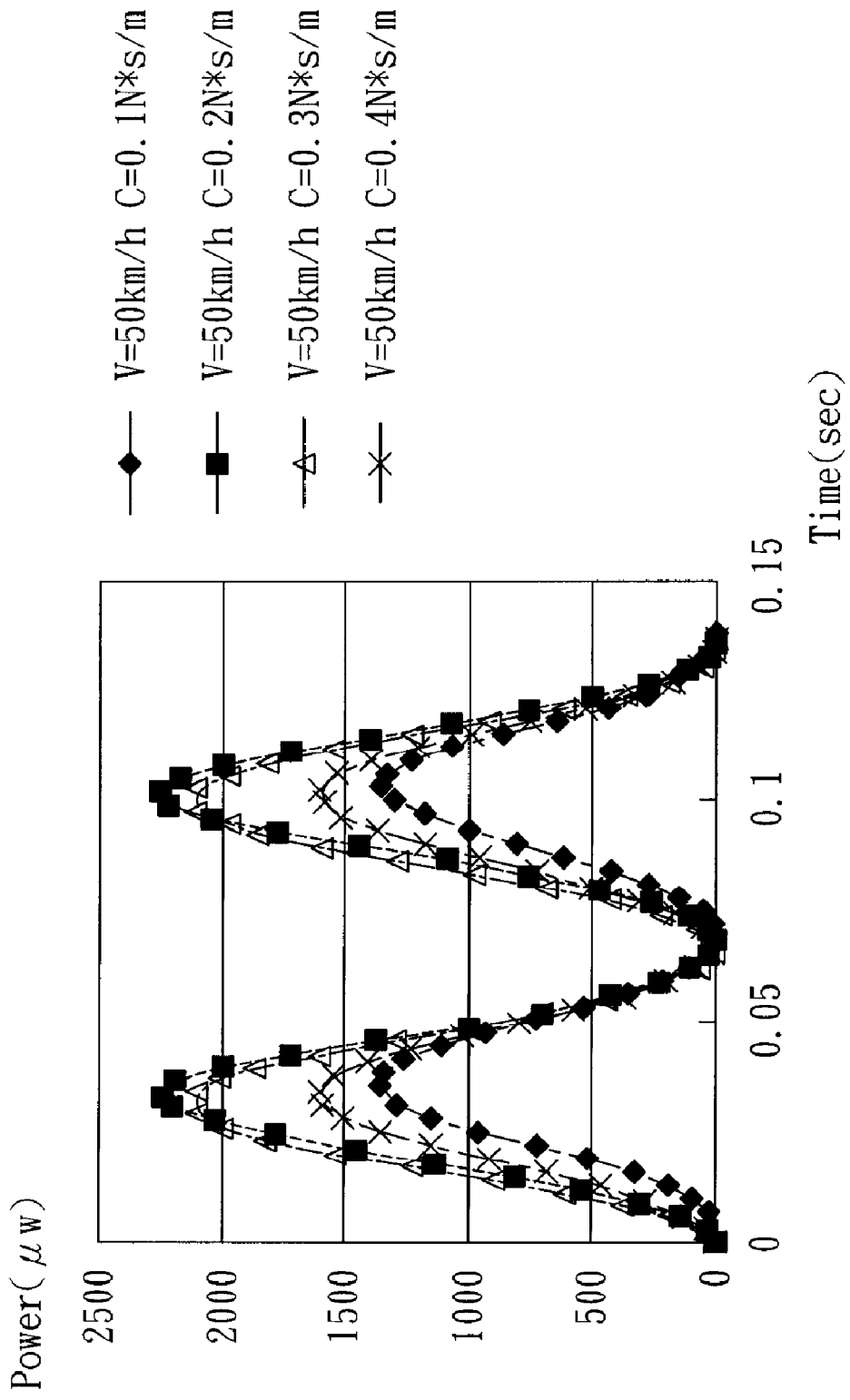
FIG. 9 is a graph showing the power generated by the energy harvester of the present invention.

As shown in FIG. 8A, which is a schematic diagram of an energy harvester according to another embodiment of the present invention, the energy harvester 3 comprises an energy provider 30, a magnetic swinging mechanism 31 and a pair of induction coils 33. The energy provider 30 is structured as the energy provider 20 in the previous embodiment in FIG. 4, and thus description there is not repeated herein. The magnetic swinging mechanism 31 comprises a swinging portion 310 and a weight loading portion 311. In the present embodiment, the swinging portion 310 and the weight loading portion 311 are structured as those in FIG. 4 except that the objects 3110 on both ends of the weight loading portion 311 are magnetic objects, which may provide a magnetic field. The pair of induction coils 33 are disposed respectively on one side of the magnetic objects 3110. When the energy provider 30 is rotating, the magnetic swinging mechanism 31 resonates according to the description in FIG. 4. Therefore, an induced current is induced in the pair of the induction coils 33 during the swinging of the magnetic objects 3110 so as to store induced energy in the energy storage device 34 coupled to the induction coils 33. Please refer to FIG. 9, which is a graph showing the power generated by the energy harvester of the present invention. In FIG. 9, it is found that the swinging mechanism disposed on the rim may generate milli-watts of power when the car is moving at a speed of 50 Km/hr.

Figure 8B:
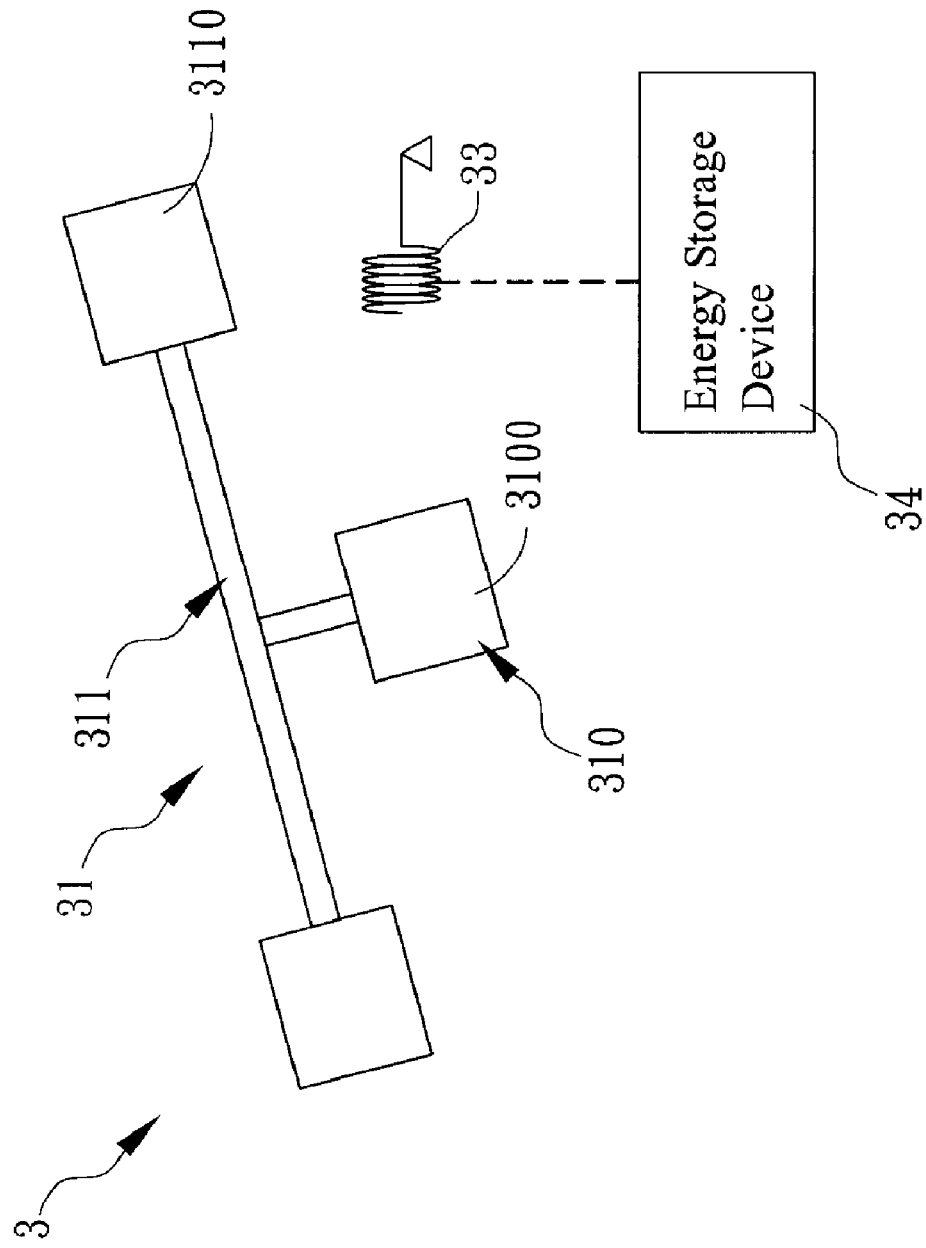
FIG. 8B is a schematic diagram of an energy harvester according to still another embodiment of the present invention.

Please refer to FIG. 8B, which is a schematic diagram of an energy harvester according to still another embodiment of the present invention. The present embodiment is similar to the embodiment in FIG. 8A except that the object 3100 of the swinging portion 310 in the present embodiment is a magnetic object. Therefore, the induction coil 33 is disposed on a position corresponding to the magnetic object 3100 of the swinging portion 310. Referring to FIG. 8A, the energy storage device 34 is further coupled to a sensor 35. In the present embodiment, the sensor 35 is a pressure sensor for detecting whether the tire pressure is normal. Certainly, the magnetic swinging mechanism 31 can be replaced according to FIG. 7A to FIG. 7F.

Accordingly, the present invention discloses a swinging apparatus and an energy harvester using the swinging apparatus wherein the swinging frequency can be adjusted automatically and mechanical energy can be converted to electrical energy. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A swinging apparatus, comprising:
   an energy provider, being capable of performing a rotational movement with respect to a rotational axis; and
   a swinging mechanism, being disposed on the energy provider and being a specific distance away from the rotational axis, wherein the swinging mechanism has an equivalent constant and a rotational inertia, and a characteristic value is defined as a ratio of the rotational inertia of the swinging mechanism to the equivalent constant of the swinging mechanism;
   wherein a ratio of the specific distance to the characteristic value is in a range between 4 and 0.25.

2. The swinging apparatus as recited in claim 1, wherein the swinging mechanism comprises a single object or a plurality of objects.

3. The swinging apparatus as recited in claim 1, wherein the swinging mechanism comprises:
 a swinging portion, being disposed on the energy provider and capable of swinging with respect to fulcrum, the fulcrum is a specific distance away from the rotational axis of the energy provider; and
 a weight loading portion, being connected to the swinging portion so that the swinging frequency of the swinging mechanism varies with the change of frequency of the energy from the energy provider.

4. The swinging apparatus as recited in claim 3, wherein the swinging frequency of the swinging mechanism is a resonant frequency of the swinging mechanism.

5. The swinging apparatus as recited in claim 4, wherein the swinging frequency of the swinging portion complies with the frequency of the energy from the energy provider.

6. The swinging apparatus as recited in claim 3, wherein the weight loading portion is connected to the swinging portion at the fulcrum.

7. The swinging apparatus as recited in claim 6, wherein the weight loading portion further comprises:
 at least one shaft, being coupled to the fulcrum on one end; and
 at least one object, being coupled to the other end of the at least one shaft.

8. The swinging apparatus as recited in claim 6, wherein the weight loading portion further comprises:
 at least one shaft, being coupled to the swinging portion on one end; and
 at least one object, being coupled to the other end of the at least one shaft.

9. The swinging apparatus as recited in claim 6, wherein the swinging portion further comprises:
 at least one shaft, being coupled to the fulcrum on one end; and
 at least one object, being coupled to the other end of the at least one shaft.

10. The swinging apparatus as recited in claim 3, wherein the energy provider further performs a translational movement.

11. The swinging apparatus as recited in claim 3, wherein the frequency of the energy from the energy provider is the frequency of gravity variation.

12. An energy harvester, comprising:
 an energy provider, being capable of performing a rotational movement with respect to a rotational axis;
 a magnetic swinging mechanism, being disposed on the energy provider and being a specific distance away from the rotational axis, wherein the swinging mechanism has an equivalent constant and a rotational inertia, and a characteristic value is defined as a ratio of the rotational inertia of the swinging mechanism to the equivalent constant of the swinging mechanism; and
 an induction coil portion, being disposed corresponding to the magnetic swinging mechanism to generate an induced current when the magnetic swinging mechanism is swinging;
 wherein a ratio of the specific distance to the characteristic value is in a range between 4 and 0.25.

13. The energy harvester as recited in claim 12, wherein the magnetic swinging mechanism further comprises:
 a swinging portion being disposed on the energy provider and being capable of swinging with respect to a fulcrum; and
 a weight loading portion, being connected to the swinging portion so that the swinging frequency of the swinging mechanism varies with the change of frequency of the energy from the energy provider.

14. The energy harvester as recited in claim 12, wherein the swinging frequency of the swinging mechanism is a resonant frequency of the swinging mechanism.

15. The energy harvester as recited in claim 14, wherein the swinging frequency of the swinging portion complies with the frequency of the energy from the energy provider.

16. The energy harvester as recited in claim 12, wherein the weight loading portion is connected to the swinging portion at the fulcrum.

17. The energy harvester as recited in claim 16, wherein the weight loading portion further comprises:
 at least one shaft, being coupled to the fulcrum on one end; and
 at least one object, being coupled to the other end of the at least one shaft.

18. The energy harvester as recited in claim 17, wherein the object is a magnetic object.

19. The energy harvester as recited in claim 16, wherein the weight loading portion further comprises:
 at least one shaft, being coupled to the swinging portion on one end; and
 at least one object, being coupled to the other end of the at least one shaft.

20. The energy harvester as recited in claim 19, wherein the object is a magnetic object.

21. The energy harvester as recited in claim 16, wherein the swinging portion further comprises:
 at least one shaft, being coupled to the fulcrum on one end; and
 at least one object, being coupled to the other end of the at least one shaft.

22. The energy harvester as recited in claim 21, wherein the object is a magnetic object.

23. The energy harvester as recited in claim 12, wherein the energy provider further performs a translational movement.

24. The energy harvester as recited in claim 12, wherein the frequency of the energy from the energy provider is the frequency of gravity variation.

25. The energy harvester as recited in claim 12, further comprises an energy storage device being coupled to the induction coil portion to store the electric energy generated by the induction coil portion.

26. The energy harvester as recited in claim 25, wherein the energy storage device is further coupled to a sensor.

27. The energy harvester as recited in claim 26, wherein the sensor is a pressure sensor.

28. The energy harvester as recited in claim 12, wherein the swinging mechanism comprises a single object or a plurality of objects.

29. The energy harvester as recited in claim 12, wherein the magnetic swinging mechanism further comprises:
 a connecting portion, having a fulcrum on one end so that the magnetic swinging mechanism may swing with respect to the fulcrum; and
 at least one magnetic object, being connected to the connecting portion.

30. The energy harvester as recited in claim 29, wherein the induction coil portion further comprises:
 a pipe, being capable of accommodating one end of the at least one magnetic object; and
 a coil, enclosing the pipe.

31. The energy harvester as recited in claim 29, wherein the magnetic swinging mechanism comprises two of the magnetic objects adjacent to each other, and a gap is formed between the adjacent magnetic objects.

32. The energy harvester as recited in claim 12, the energy provider is a tire.

* * * * *